United States Patent
Mizuno et al.

(10) Patent No.: US 6,877,807 B2
(45) Date of Patent: Apr. 12, 2005

(54) VEHICULAR UNDER-SEAT COMPARTMENT MECHANISM

(75) Inventors: Koji Mizuno, Nagoya (JP); Yasuji Morinishi, Okazaki (JP); Shingo Kutomi, Nishikamo-gun (JP); Takashi Ogino, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/701,406

(22) Filed: Nov. 4, 2003

(65) Prior Publication Data

US 2004/0155494 A1 Aug. 12, 2004

(30) Foreign Application Priority Data

Nov. 6, 2002 (JP) .......................................... 2002-323084
Nov. 6, 2002 (JP) .......................................... 2002-323085

(51) Int. Cl.[7] ................................................ A47C 7/62
(52) U.S. Cl. ............................... 297/188.1; 297/188.09; 297/188.08
(58) Field of Search ......................... 297/188.1, 188.09, 297/188.08

(56) References Cited

U.S. PATENT DOCUMENTS

| | | | | | |
|---|---|---|---|---|---|
| 344,675 A | * | 6/1886 | Ordway | ................ | 297/188.1 X |
| 534,443 A | * | 2/1895 | Manguine | ............ | 297/188.1 X |
| 720,776 A | * | 2/1903 | Bennett | ................ | 297/188.1 X |
| 1,077,199 A | * | 10/1913 | James | .................. | 297/188.1 X |
| 1,167,597 A | * | 1/1916 | Riehm | ...................... | 297/188.1 |
| 1,309,097 A | * | 7/1919 | Markwick | ............ | 297/188.1 X |
| 1,643,715 A | * | 9/1927 | Kleinsmith | ........... | 297/188.1 X |
| 1,832,642 A | * | 11/1931 | Leff | ......................... | 297/188.1 |
| 2,682,915 A | * | 7/1954 | Forti | ........................ | 297/188.1 |
| 2,696,870 A | * | 12/1954 | Mende | ................. | 297/188.1 X |
| 2,759,529 A | * | 8/1956 | Hagadorn | ............. | 297/188.1 X |
| 2,804,122 A | * | 8/1957 | Baum | ................... | 297/188.1 X |
| 2,950,753 A | * | 8/1960 | Gleitsman et al. | ..... | 297/188.01 |
| 3,189,380 A | * | 6/1965 | Reguitti | ............... | 297/188.1 X |
| 3,336,077 A | * | 8/1967 | Radke et al. | ............ | 297/188.1 |
| 3,594,039 A | * | 7/1971 | Harp | .................... | 297/188.1 X |
| 5,209,178 A | * | 5/1993 | Rowe | .................. | 297/188.1 X |

(Continued)

FOREIGN PATENT DOCUMENTS

| | | | | |
|---|---|---|---|---|
| DE | 3114509 A1 | * | 11/1982 | ............ 297/188.09 |
| DE | 42 30 242 A1 | | 3/1994 | |
| DE | 299 12 285 U1 | | 9/1999 | |
| GB | 2 316 608 A | | 3/1998 | |
| JP | 7-52715 | | 2/1995 | |
| JP | 7-52716 | | 2/1995 | |

*Primary Examiner*—Rodney B. White
(74) *Attorney, Agent, or Firm*—Rossi, Kimms & McDowell (57) ABSTRACT

To utilize limited space in a vehicle cabin, a vehicular under-seat compartment mechanism includes a hinge mechanism, a compartment and a lock mechanism. The hinge mechanism interconnects a seat-frame and a seat-cushion in such a manner that the seat-cushion is pivotally rotatable with respect to the seat-frame. The compartment is disposed in the under-seat space under the seat and is formed an opening upwardly. The lock mechanism, integrated with the hinge mechanism, locks the seat-cushion at an upright position, at which the seat-cushion is pivotally flipped up about the hinge mechanism so that the compartment is accessible.

14 Claims, 8 Drawing Sheets

U.S. PATENT DOCUMENTS

| | | | | |
|---|---|---|---|---|
| 5,584,530 A | * | 12/1996 | Rogers et al. | 297/188.1 |
| 5,597,199 A | * | 1/1997 | Hoffman et al. | 297/188.1 X |
| 5,622,404 A | * | 4/1997 | Menne | 297/188.1 |
| 5,720,513 A | * | 2/1998 | Raukauskas | 297/188.1 |
| 5,816,650 A | * | 10/1998 | Lucas, Jr. | 297/188.1 |
| 5,848,820 A | * | 12/1998 | Hecht et al. | 297/188.1 |
| 5,884,795 A | * | 3/1999 | Godbersen et al. | 297/188.1 X |
| 5,902,009 A | * | 5/1999 | Singh et al. | 297/188.1 |
| 5,911,471 A | * | 6/1999 | Benedict et al. | 297/188.09 X |
| 6,102,463 A | * | 8/2000 | Swanson et al. | 297/188.1 X |
| 6,135,549 A | * | 10/2000 | Demick et al. | 297/188.1 |
| 6,161,896 A | * | 12/2000 | Johnson et al. | 297/188.1 |
| 6,390,547 B1 | * | 5/2002 | Spykerman | 297/188.1 |
| 6,419,313 B1 | * | 7/2002 | Newman | 297/188.1 |
| 6,435,609 B1 | * | 8/2002 | Gasser | 297/188.1 |
| 6,488,327 B1 | * | 12/2002 | Pearse et al. | 297/188.1 X |
| 6,752,443 B1 | * | 6/2004 | Thompson et al. | 297/188.1 X |
| 2002/0005649 A1 | * | 1/2002 | Hofmann et al. | 297/188.1 X |

* cited by examiner

VEHICULAR UNDER-SEAT COMPARTMENT MECHANISM

BACKGROUND OF THE INVENTION

1. Field of the Invention

The present invention relates to a seat compartment mechanism. More particularly the invention concerns an improvement of the seat compartment mechanism for practically using a space under a seat in a vehicle.

2. Description of Related Art

To utilize space in a vehicle cabin, techniques such as those of the following patent publications disclose disposing a container under a passenger seat. The disclosed techniques will be discussed with reference to accompanying drawing FIG. 8

Japanese Patent Publications

1: 3070810

2: 3070811

Figure 8:
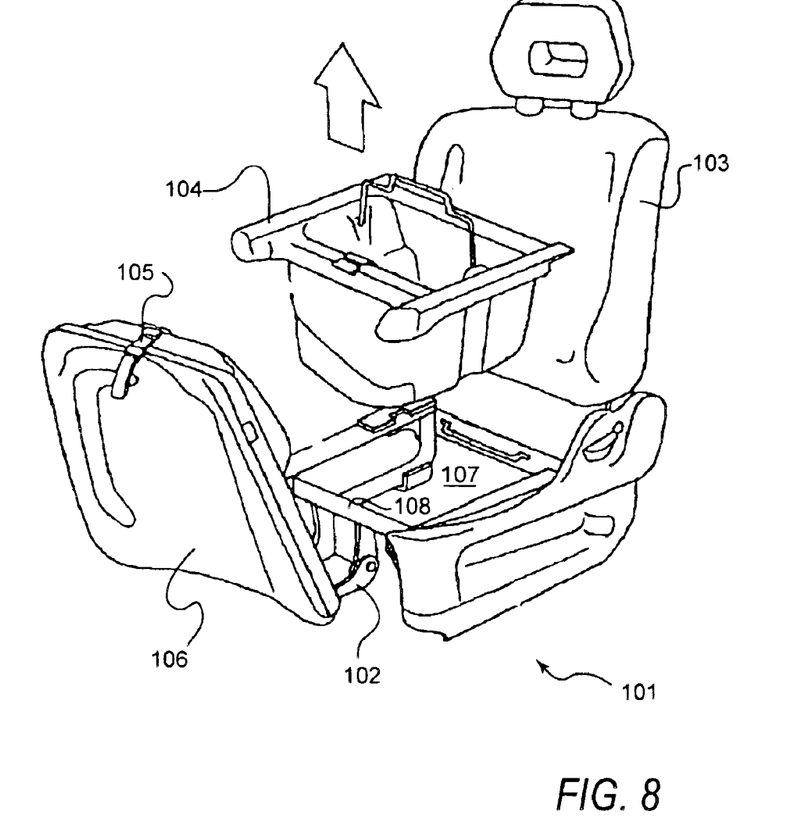
FIG. 8 is a perspective view showing a conventional under seat container mechanism.

A conventional seat 101 mainly comprises a seat-back 103, a seat cushion 106 and a seat frame 108. The seat cushion 106 is pivotally connected with a front edge of the seat frame 108 via a hinge 102. The seat cushion 106 has a latch mechanism at a rear end of the seat cushion 106 for latching the seat cushion 106 with respect to the seat frame 108 at a position that a user can sit down on the seat cushion 106.

Between the seat cushion 106 and floor is a space 107 within which a detachable container 104 fits. When the user puts an object into the container 104 or detaches the container 104 from the seat 101, the user releases the latching of the seat cushion 106 by the latch mechanism 105. The user then rotates a rear end of the seat cushion 106 forwardly about the hinge 102 so that the user can access the container 104.

However, the techniques of the above Japanese patent publications entail some inconvenience because the seat cushion 106 cannot remain upright in an open position after the user rotates the seat cushion 106, as the hinge 102 simply provides an axis on which rotate the seat cushion 106 with respect to the seat frame 108. By such arrangement as above, it is therefore impossible to put in an object whose size is bigger than the capacity of the container 104 in the space 107 under the seat cushion 106.

In other words, according to the techniques of the Japanese patent publications, the user has to hold the seat cushion 106 by hand in the open position if an object, which is oversized with respect to the capacity of the container 104, is placed in the container 104.

Without being held by hand, the seat cushion 106 teeters about the hinge 102 and will not remain in the open position. Therefore the unstable seat cushion 106 may press or lean on the oversized object, sticking out from inside the container 104, causing damage.

Consequently, according to the techniques of Japanese patent publications #1 and #2, it is difficult to put a bulky or an oversized object in the container 104 and it is therefore impossible to utilize the space 107 under the seat 101.

SUMMARY OF THE INVENTION

With the foregoing problems in view, it is a object of the present invention to provide a vehicular under-seat compartment mechanism in which space under a seat can be fully utilized by simple manner.

According to one generic feature of the invention, the object is accomplished by a vehicular under-seat compartment mechanism for utilizing space under a seat having a seat-frame and a seat-cushion disposed on the seat-frame, the mechanism comprising: a hinge mechanism interconnecting the seat-frame and the seat-cushion in such a manner that the seat-cushion is pivotally rotatable with respect to the seat-frame; a compartment, which is disposed in the under-seat space under the seat and is formed an opening upwardly, and a lock mechanism, integrated with the hinge mechanism, for locking the seat-cushion at an upright position, at which the seat-cushion is pivotally flipped up about the hinge mechanism so that the compartment is accessible.

As a specific feature, the vehicular under-seat compartment mechanism further comprises a release mechanism for releasing the locking of the seat-cushion by the lock mechanism.

As another specific feature, the release mechanism may include an unlocking strap disposed at a rear end of the seat-cushion, and a wire linking between the unlocking strap and the lock mechanism in such a manner that when the unlocking strap is operated by an user, the locking of the seat-cushion by the lock mechanism is released.

As another preferable feature, the lock mechanism may include a cam, fixed on the seat-frame, the cam having a first slot and a second slot, and a lock member, disposed to the seat-cushion for selectively engaging with one of the first and second slot so that when the lock member engages with the second slot, the seat-cushion is locked in the upright position and so that when the lock member engages with the first slot, the seat-cushion is locked in a horizontal position at which the seat-cushion lays on the seat-frame horizontally.

As an additional preferable feature, the vehicular under-seat compartment mechanism further comprises an inner lid, disposed between the seat-cushion and the compartment, for covering the opening of the compartment.

As a further preferable feature, the vehicular under-seat compartment mechanism further comprises a seat-hook attached at the back face of the seat-cushion, and an inner lid strap attached to the inner lid to be hooked on the seat-hook.

As a still further preferable feature, the vehicular under-seat compartment mechanism further comprises an extra wall upwardly projected from an edge of the opening of the compartment along with the edge of the opening.

As a still additional preferable feature, the vehicular under-seat compartment mechanism further comprises one or more netting hooks, disposed around the opening of the compartment, for engaging a net so as to keep an object in the compartment.

Following are advantageous results with the present invention:

Partly because the seat-cushion is locked in a upright position by the lock mechanism, it is therefore possible to fully utilize the space under the seat.

Because the unlock mechanism is equipped with the lock mechanism for unlocking the locking by the lock mechanism, further, the unlock strap is disposed at the rear end of the seat-cushion. It is therefore possible to flip up the seat-cushion with a simple action of pulling up the unlocking strap by a user so that the seat-cushion is rotated to the upright position. Further, the user is required to take two actions; the first action is pulling the unlocking strap and the second action is pivotally moving the seat-cushion to the horizontal position. With this arrangement, it is possible to avoid excessively fast rotation of the seat-cushion therefore the user can rotate the seat-cushion to the horizontal position at a preferable speed even if the user disregards the motion speed of the seat-cushion.

Partly because, the lock pin selectably fits into the first slot or the second slot of the cam. Thus, it is possible to avoid the user sitting on the seat cushion in an intermediate position between the upright position and the horizontal position. Namely, the seat-cushion cannot be fixed in such an intermediate position, and the seat-cushion 12 is raised perpendicularly in the upright position. The user should therefore be easily aware that it is not possible to sit on a seat in the upright position, and that sea-cushion should be rotated before sitting is possible. Further, the unlock strap and the cam is linked by the wire, it is therefore possible to avoid limitation of arrangement of the location of the unlock strap so that the unlock strap is disposed at a position useful for the user.

When the seat-cushion is in the upright position, the inner lid can be placed thereon objects, it is therefore possible to utilize limited space in a vehicle. Further, it is possible to tidy up in the vehicle because the inner lid covers the opening of the compartment so as to avoid exposing objects in the compartment.

Partly because, the inner lid is held in the opening position by the inner lid strap hooking onto the seat-hook attached on the back face of the seat-cushion. It is therefore possible to be placed even long and/or bulky objects in the compartment. It is also possible to become more convenient for uses in such a way that the seat-hook can be used as a hook for hooking, for example, the handle of a bag.

Because the extra wall is higher than the inner lid in the closed position, it is therefore possible to avoid rolling down an object, which is placed on the inner lid, onto the floor.

Partly because the netting hooks are fixed around the opening of the compartment, objects in the compartment can be fasten.

DETARILED DESCRIPTION

An embodiment of the present invention will now be described with reference to the accompanying drawings FIGS. 1 through 7.

Figure 1:
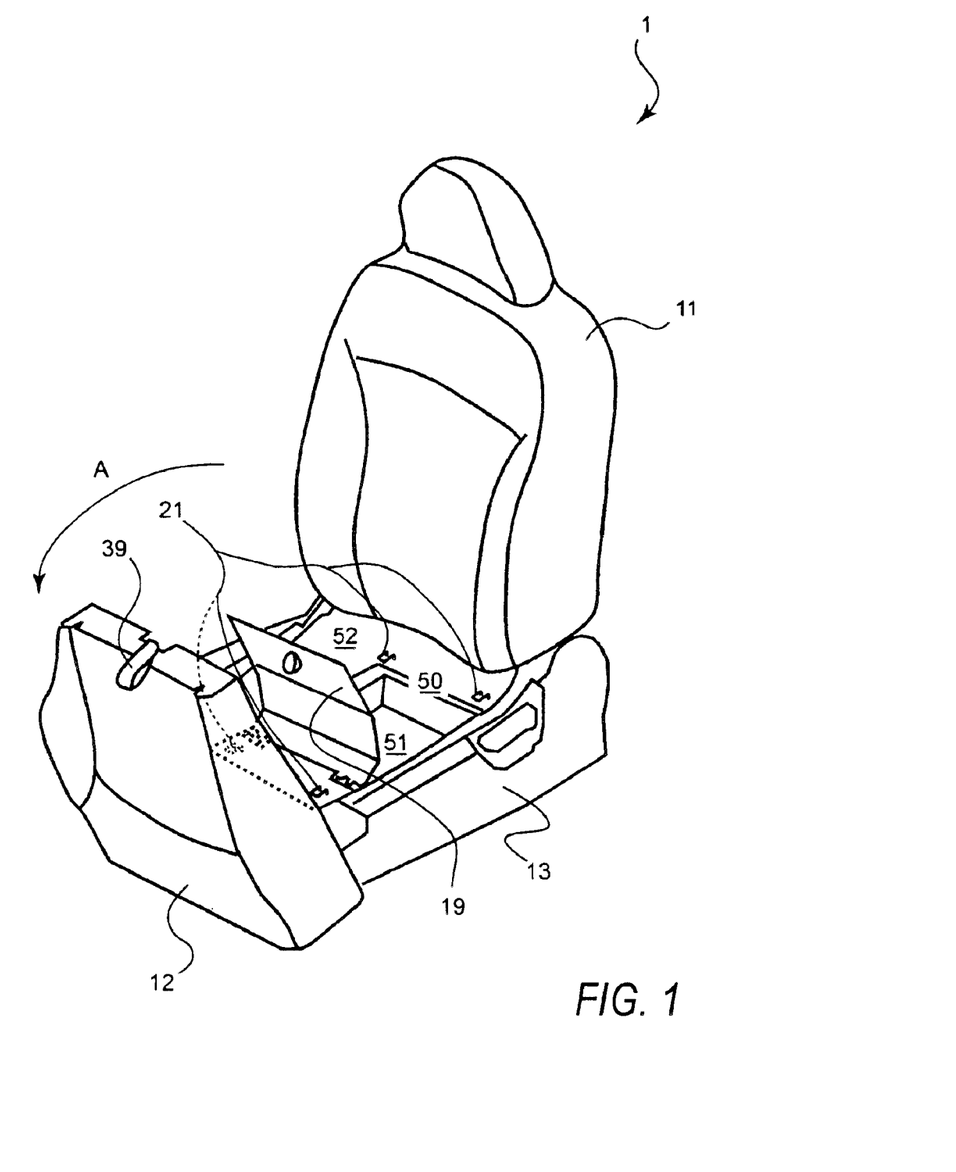
FIG. 1 is a perspective view showing a vehicular under-seat compartment mechanism according to one embodiment of the present invention.
Figure 2:
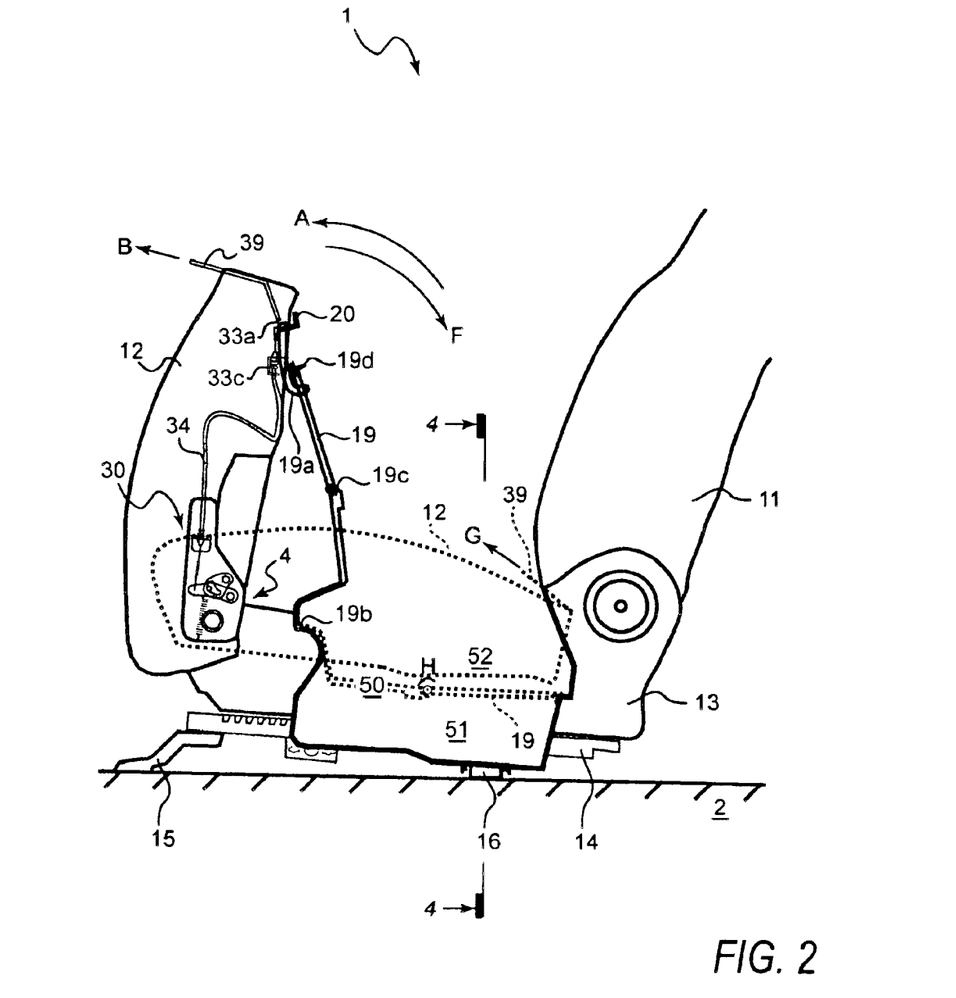
FIG. 2 is a schematic side view of the vehicular under-seat compartment mechanism showing a seat-cushion in an upright position.
Figure 3:
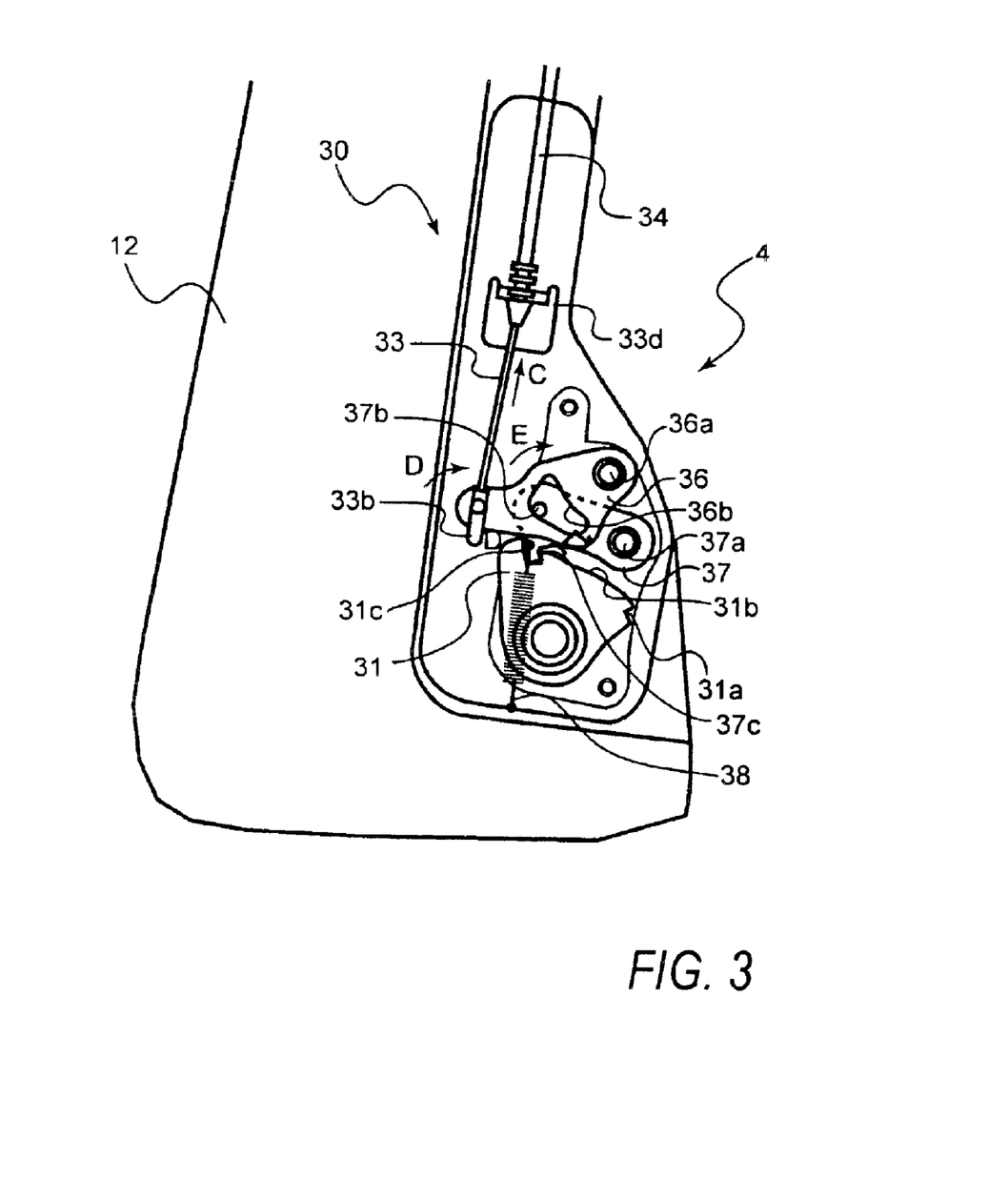
FIG. 3 is a detailed view showing a lock mechanism when the seat-cushion is in the upright position.
Figure 4:
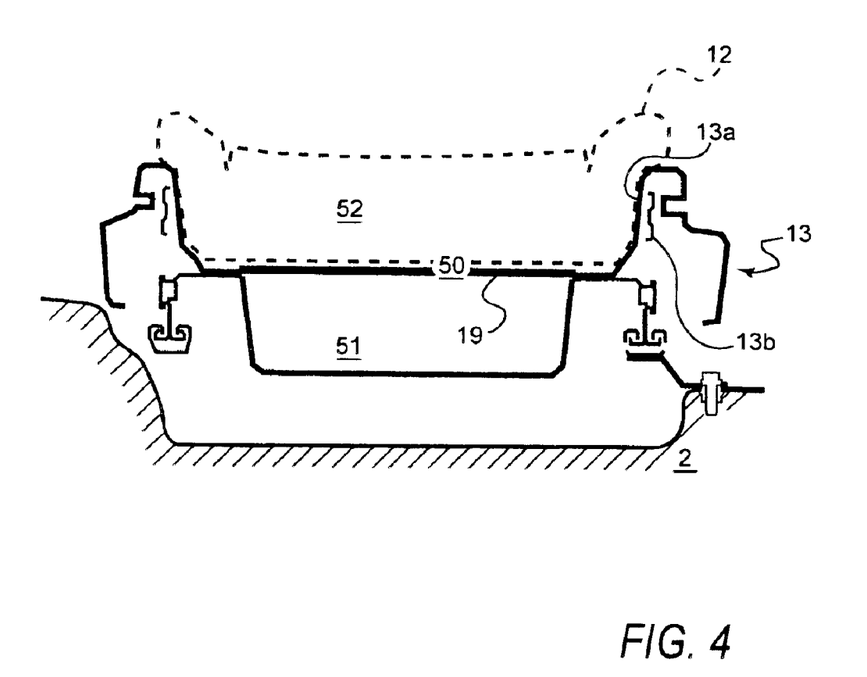
FIG. 4 is a schematic sectional view of the seat mechanism taken along lines 4—4 of FIG. 2.
Figure 5:
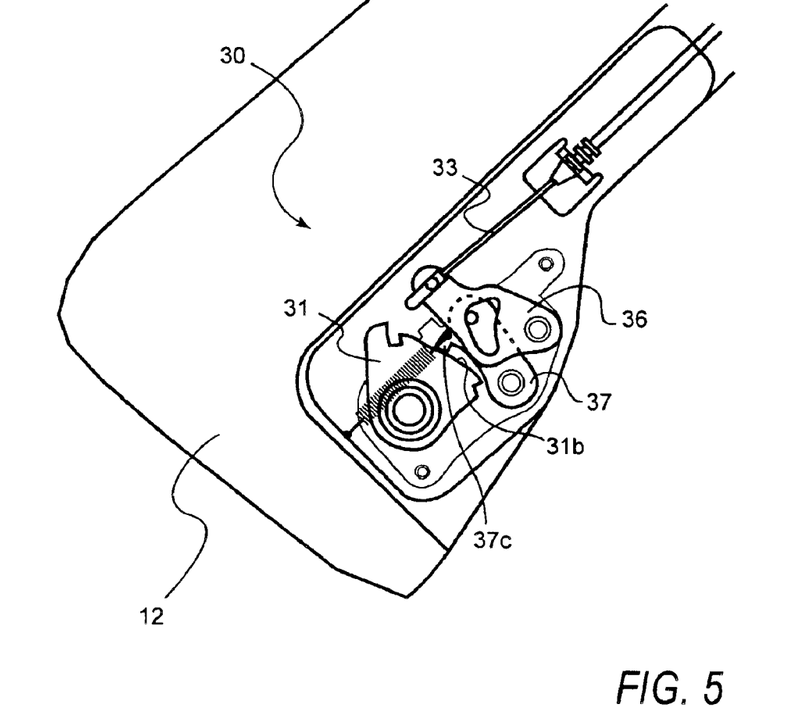
FIG. 5 is a detailed view showing a lock mechanism when the seat-cushion is at between the upright position and a horizontal position.
Figure 6:
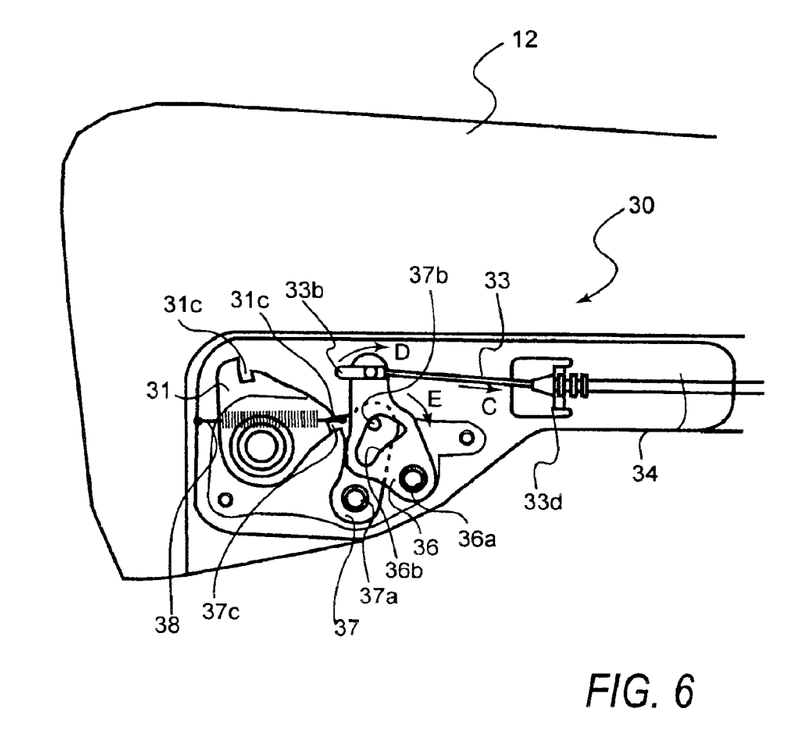
FIG. 6 is a detailed view showing a lock mechanism when the seat-cushion is in the horizontal position.
Figure 7:
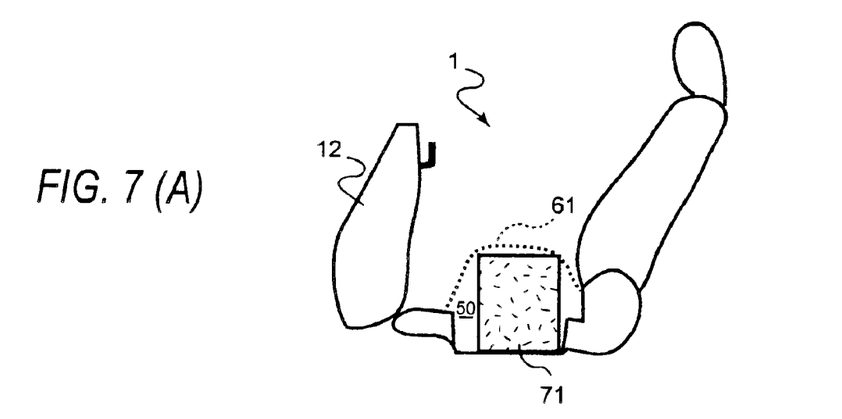
FIG. 7(A) is a schematic view showing how an example of how an object placing in the compartment.
FIG. 7(B) is a schematic view showing how an example of how an object placing in the compartment.
FIG. 7(C) is a schematic view showing how an example of how an object placing in the compartment.

FIG. 1 is a perspective view showing a vehicular under-seat compartment mechanism; FIG. 2 is a schematic side view showing the vehicular under-seat compartment mechanism when a seat-cushion is in a upright position;

FIG. 3 is a detailed view of a lock mechanism when the seat-cushion is in the upright position; FIG. 4 is a schematic sectional view of the seat mechanism taken along the lines 4—4 of FIG. 2; FIG. 5 is a detailed view showing a lock mechanism when the seat-cushion is between the upright position and a horizontal position; FIG. 6 is a detailed view showing a lock mechanism when the seat-cushion is in the horizontal position; and each of FIG. 7(A), FIG. 7(B), and FIG. 7(C) is a schematic view showing examples of how an object is placed in the compartment.

As shown in FIG. 1, a seat 1 mainly includes a seat-back 11, a seat-cushion 12 and a seat-bottom 13.

The seat-cushion 12 is disposed on a seat-frame 13b, which is an element of the seat-bottom 13, and is supported by a hinge mechanism (not shown in FIG. 1). The hinge mechanism interconnects the seat-frame 13b and a front edge of the seat-cushion 12 in such a manner that the seat-cushion 12 pivotally rotates with respect to the seat-frame 13b.

With this arrangement, if a user pulls upwardly an unlocking strap 39, which is disposed in a rear end of the seat-cushion 12, then the rear end of the seat-cushion 12 is pivotally flipped up about the hinge mechanism as shown an arrow A in FIG. 1 so that the user can access inside of a lower compartment (hereinafter also called simply "compartment") 51, which is disposed in the seat-bottom 13 under the seat-cushion 12 and is formed an opening upwardly, through space 50 defined by the upright seat-cushion 12, seat-back 11 and the seat-bottom 13.

The inner lid 19 is disposed between the seat-cushion 12 and the lower compartment 51 and the inner lid 19 is openable and closable the opening of the compartment 52. In other words, the inner lid 19 covers the opening of the lower compartment 51 so that the space 50 is horizontally divided into an upper compartment 52 and a lower compartment 51.

The lower compartment 51 provides space for storing small objects and the upper compartment 52 provides space for storing bulky objects by putting on the closed inner lid 19.

Here, each element of seat 1 will be described in detail. In the following description, an "upright position" is defined as a position of the seat-cushion 12, which is pivotally flipped up as shown by arrow A in FIG. 2, and is almost perpendicular with respect to a floor 2 of a vehicle. A "horizontal position" is defined as a position at which the seat-cushion lays on the seat-frame (13b) horizontally so as to be sit thereon by a user (see symbol 12 of dotted leader line in FIG. 2).

As shown in FIG. 2 and FIG. 3, seat-cushion 12 is selectably held (locked) in the horizontal position or the upright position by a lock mechanism 30. The lock mechanism 30 is integrated with the hinge mechanism 4 and includes a cam 31, a lock plate (lock member) 37, an unlock plate (unlock member) 36, a wire 33 and strap (unlocking strap) 39. Specifically, a mechanism, which has the strap 39, the wire 33 and the unlock plate 36, is called a release mechanism.

The cam 31, which is a plate-shaped cam, is fixed, irrespective of rotation or position of the seat-cushion 12, at the seat frame 13b. The fixed cam 31 has two recesses; a first slot 31a and a second slot 31c, and a sliding edge 31b. The first slot 31a is for fitting therein a lock pin 37c of the lock plate 37 when the seat-cushion 12 is in the horizontal position. The second slot 31c for also fitting therein the lock pin 37c when the seat-cushion 12 is in the upright position. The sliding edge 31b is a surface along which the lock pin 37c moves while the seat-cushion 12 rotates between the horizontal position and the upright position.

One end of the lock plate 37 is pivotally mounted by a pivot axis 37a on the seat-cushion 12. At another end of the lock plate 37, the lock pin 37c is disposed to fit into the first slot 31a or the second slot 31c.

The lock plate 37 is pressed toward the fixed cam 31 by a spring 38. At a front face of the lock plate 37, an unlock pin 37b is also disposed. The unlock pin 37b contacts an inner edge 36b of the unlock member 36.

One end of the unlock member 36 is pivotally mounted by a pivot axis 36a on the seat-cushion 12. At another end of the unlock member 36, an end 33b of the wire 33 is connected. At a middle of the unlock member 36, the inner edge 36b is formed to engage with the pin 37b formed on the lock plate 37.

As shown in FIG. 2, another end 33a of the wire 33 is connected to an unlocking strap 39, upwardly projecting from the rear end of the seat-cushion 12, the other end 33b of the wire 33 being connected with the unlock mechanism 36, as shown in FIG. 3.

The wire 33 is covered by wire sleeve 34, which is fixed on to the seat-cushion 12 by the supporting member 33c and 33d disposed at both ends of the sleeve 34.

When the user pulls the unlocking strap 39 upwards (see an arrow B in FIG. 2), the wire 33 is also pulled in the direction of an arrow C indicated in FIG. 3. At the same time, the unlock member 36, which is connected with the wire 33, is rotatably moved in the direction of an arrow D, then the lock pin 37b, which is formed on the lock plate 37 and is engaged with the inner edge 36b, is moved in the direction of an arrow E. Then the lock pin 37c of the lock plate 37 is pulled out from the second slot 31c of the fixed cam 31.

With this arrangement, the locking of the seat-cushion 12 in the upright position is released (unlocked) to allow the seat-cushion 12 to rotate in the direction of an arrow F in FIG. 2.

Shown in FIG. 2, the seat-bottom 13, which holds a seat-back 11 and the seat-cushion 12, is slidably mounted on the floor 2 via a slide rail 14 and brackets 15 and 16 so that the seat 1 slidably moves with respect to the floor 2, longitudinally. The lower compartment 51 is disposed within the seat-bottom 13, and the inner lid 19 is closable the opening of the lower compartment 51 so that the space 50 is divided into the upper compartment 52 and the lower compartment 51. When the inner lid 19 divides the space 50 horizontally and covers the opening of the lower compartment 51, a position of the inner lid 19 is called a "closed position" (see sold line of the inner lid 19 in FIG. 4). And also, when the inner lid 19 is flipped up to and does not cover the opening of the lower compartment 51, another position of the inner lid 19 is called an "open position" (see solid line of the inner lid 19 in FIG. 2).

In FIG. 4, an extra wall 13a is projected upwardly from an edge of the opening of the lower compartment 51 and the extra wall 13a is fixed along with the opening edge of the lower compartment 51. The height of the extra wall 13a is arranged so as to be higher than the inner-lid 19 in the closed position. A space enclosed by the wall 13a and over the inner lid 19, is defined as the upper compartment 52. With this arrangement, even if the user puts a small item (cf. pen etc.) on the inner lid 19, it is possible to avoid rolling down onto the floor 2. Further, the upper compartment 52 can be placed bulky objects because the upper compartment 52 opens upwardly when the seat-cushion 12 is in the upright position.

The seat-cushion 12, in the horizontal position, retracts into the upper compartment 52. Therefore, only the lower compartment 51 is available as a container while the seat-cushion 12 is in the horizontal position.

Four netting hooks 21 are fixed around the opening edge of the lower compartment 51 of the seat-bottom 13, as shown in FIG. 1. FIGS. 7(A) and 7(B) show how to use the netting hooks 21, whereby net 61 covers objects 71 and 72, which are placed in the space 50, net 61 being fixed to the seat bottom 13.

In the meantime, the inner lid 19 is pivotally mounted on the seat bottom 13 about a front axis 19b disposed between a front edge of the inner lid 19 and the seat-bottom 13. The inner lid 19 also has an intermediate axis 19c so that the inner lid 19 is bent about the intermediate axis 19c as an arrow H indicated in FIG. 2. Further, the inner lid 19 has an inner lid strap 19a for hooking onto a seat-hook 20 attached on a back face of the seat-cushion 12. When the inner lid strap 19a is hooked with the seat-hook 20, large capacity is made the upper compartment 52 and lower compartment 51 communicate to become one space 50. This capacity is sufficient to hold long and/or bulky objects.

Further, the inner lid 19 is detachable from the seat-bottom 13 thereby making it is therefore possible to obtain father capacity when the capacity is still insufficient when the inner strap 19a and the seat-hook 20 are hooked up (see FIG. 7(A)).

At a back face of the inner lid 19, inner lid latch 19d is disposed. The inner lid latch 19d is contacted with an inner wall of the lower compartment 51 so that the inner lid 19 stays in the closed position (see symbol 19 of dotted leader line in FIG. 2) even when the vehicle jolts.

When the inner lid 19 is in the closed position the lower compartment 51 can hold a small item such as an item 73 as shown FIG. 7(B) while holding the object 72 on top of lid 19. Thus, it is possible to avoid the object 72 pressing down the small item 73 in the lower compartment 51, because the inner lid 19 supports the object 72.

When the seat-cushion 12 is in the upright position and the inner lid 19 is in the closed position, as shown in FIG. 7(C), the seat-hook 20 can be utilized as a hook for hooking, for example, the handle of a shopping bag 74. Namely, the seat-hook 20 can be used for hooking the lid strap 19a and also items such the shopping bag 74.

With the above mentioned arrangement, the vehicular under-seat compartment mechanism according to the present invention guarantees the following advantages.

When the user puts an item or object into the space 50, the upper compartment 51 and/or the lower compartment 52), the user holds the unlocking strap 39 of the seat-cushion 12 in the horizontal position as depicted by the dotted line in FIG. 2, and pulls the strap 39 upwards as shown by an arrow G in FIG. 2. Thus, the lock mechanism 30 is unlocked as shown in FIG. 6, the wire 33 is pulled back as indicated by the arrow C and then unlock member 36, which is connected with the end 33b of the wire 33, is rotated in a direction indicated as by arrow D. The lock plate 37 is rotated against elastic force by the spring 38 about the pivot axis 37a to a direction indicated by an arrow E. The unlock pin 37b, engaging with the inner edge 36b, is also moved to a direction indicated by the arrow E and then the lock pin 37c is pulled out from the first slot 31a. In this manner, the locking of the seat-cushion 12 by the lock mechanism 30 is released.

While the user pulls up the unlocking strap 39 so that the seat-cushion 12 becomes in the upright position from the horizontal position, the lock pin 37c of the lock plate 37 slides on the sliding edge 31b of the fixed cam 31 smoothly. With this arrangement, the seat-cushion 12 is not locked by the lock mechanism 30 while the seat-cushion 12 is rotated, thus the user can flip up the seat-cushion 12 with ease.

After the user unlocks the lock mechanism 30, the user also rotates the seat-cushion 12 forwardly as shown in FIG. 3, and the seat-cushion 12 is locked in the upright position 12 by locking the lock plate 37 and the fixed cam 31 of the lock mechanism 30 in such a manner that the lock pin 37c fits in the second slot formed on an edge of the fixed cam 31 by the spring 38 automatically.

Namely, when the seat-cushion 12 becomes in the upright position, the direction (see the arrow G in FIG. 2) of pulling the strap 39 by the user is nearly the same as the direction (see the arrow A and G in FIG. 2) of actually rotating the seat-cushion 12. By this means, the user can flip up the seat-cushion 12 quickly with just a simple action of pulling up the unlocking strap 39.

In the meantime, when the seat-cushion 12 is rotated to the horizontal position from the upright position (see an arrow F indicated in FIG. 2), firstly, the user must pull the unlocking strap 39 toward direction as shown an arrow B indicated in FIG. 2 to release locking by the lock mechanism 30. Thus, each of the directions shown as the arrow F and the arrow B is inverse direction. Therefore the user is required to take two actions; the first action is pulling the unlocking strap 39 and the second action is pivotally moving the seat-cushion 12 to the horizontal position.

With this arrangement, it is possible to avoid excessively fast rotation of the seat-cushion 12 in the direction F indicated in FIG. 2, therefore the user can rotate the seat-cushion 12 to the horizontal position at a preferable speed even if the user disregards the motion speed of the seat-cushion 12.

As discussed above with FIG. 3 and other related figures, the seat-cushion 12 is selectably locked at only two positions: "the horizontal position", at which the user can sit down on the seat-cushion 12; or "the upright position" at which the user can access the inside of the space 50, the upper compartment 52 and lower compartment 51, in such a manner that the lock pin 37c selectably fits into the first slot 31a or the second slot 31c of the fixed cam 31. Thus, it is possible to avoid the user sitting on the seat cushion 12 in an intermediate position between the upright position and the horizontal position.

If the seat-cushion 12 can be locked in a position at which the seat-cushion 12 is slightly raised from the horizontal position, the user may have difficulty in judging whether the seat-cushion 12 is in the horizontal position as for sitting on, the user may sit down on the seat-cushion 12 even when the seat-cushion 12 is not in the right position.

Whereas, the vehicular under-seat compartment mechanism according to the present embodiment, the seat-cushion 12 cannot be fixed in such an intermediate position, and the seat-cushion 12 is raised perpendicularly in the upright position. The user should therefore be easily aware that it is not possible to sit on a seat in the upright position, and that sea-cushion 12 should be rotated before sitting is possible.

Further, it is possible to obtain large capacity by communicating the upper compartment 51 and lower compartment 52 in such a manner that the inner lid strap 19a of the inner lid 19 is hooked up with the seat-hook 20. Thus, even a bulky object or a large sized object can be placed in the space 50.

Furthermore, the inner lid 19 can be removed from seat-bottom 13 so that the maximum capacity of the space 50 can be utilized in such cases that an object to be placed in the space 50 is very bulky as shown in FIG. 7(A). It is also possible to avoid bumping of the object 71 in the lower compartment 51 by covering the object 71 with the net 61 hooked up with the netting hooks 21 as shown in FIG. 1.

In contrast with bulky objects, placing the small item 73 as shown in FIG. 7(B), the user can put the item 73 in the lower compartment 51 and the other object 72 put on the upper face of the inner lid 19 in the closed position, at same time. Likewise as above, it is possible to avoid bumping of the object 72 in the upper compartment 52 by covering the object 72 with the net 61 hooked up with the netting hooks 21.

The inner lid 19 has the intermediate axis 19c, it is therefore possible to open/close nearly half of the area of the opening of the lower compartment 52. So when the user places or takes a small item into or from the lower compartment 51, the user can access quickly and easily the lower compartment 51 by opening only a half of the inner lid 19 about the intermediate axis 19c.

And as shown in FIG. 7(C), it is possible to hold easily and surely an object, which is placed in the space 50, a bag-like object such as shopping bag 74, of a convenience store, etc, in such way that the bag 74 is hooked up with the seat-hook 20 fixed on the back face of the seat-cushion 12.

While the invention has been described in the specification and illustrated in the drawings with reference to the embodiments, it will be understood by those skilled in the art that various changes may be made and equivalents may be substituted for elements thereof without departing from the scope of the invention as defined in the claims.

In the foregoing embodiment, the lock mechanism 30 is operated by the user pulling the unlocking strap 39 via the wire 33 interconnecting the lock mechanism 30 and the unlocking strap 39. Alternatively, a link mechanism or a gear mechanism may be substituted with the wire 33 so that the unlocking strap 39 is linked to the lock mechanism 30.

What is claimed is:

1. A vehicle seat comprising:
 a seat-frame and a seat-cushion disposed on the seat-frame;
 an under-seat compartment mechanism comprising:
  a hinge mechanism pivotally interconnecting the seat-frame and the seat-cushion so that the seat-cushion is pivotal with respect to the seat-frame;
  a compartment under the seat having an opening; and
  a lock mechanism, integrated with the hinge mechanism, for locking the seat-cushion at an upright position, at which the seat-cushion is pivoted with respect to the seat-frame so that said compartment becomes accessible; and
  a release mechanism for releasing the locking of the seat-cushion by the lock mechanism,
  wherein said release mechanism includes:
   an unlocking strap disposed at a rear end of the seat-cushion, and
   a wire linking between said unlocking strap and said lock mechanism in such a manner that when said unlocking strap is operated by a user, the locking of the seat-cushion by said lock mechanism is released.

2. A vehicle seat according to claim 1, wherein said lock mechanism includes:
   a cam fixed on the seat-frame, said cam having a first slot and a second slot, and
   a lock member, disposed to the seat-cushion for selectively engaging with one of said first and second slots so that when said lock member engages with said second slot, the seat-cushion is locked in the upright position and so that when said lock member engages with said first slot, the seat-cushion is locked in a horizontal position at which the seat-cushion lays on the seat-frame horizontally.

3. A vehicle seat according to claim 2, further comprising an inner lid, disposed between the seat-cushion and said compartment, for covering the opening of said compartment.

4. A vehicle seat according to claim 3, further comprising:
   a seat-hook attached at a back face of the seat-cushion, and
   an inner lid strap attached to said inner lid to be hooked on said seat-hook.

5. A vehicle seat according to claim 4, further comprising an extra wall upwardly projected from an edge of the opening of said compartment along with the edge of the opening.

6. A vehicle seat according to claim 5, further comprising one or wore netting hooks, disposed around the opening of said compartment, for engaging a net so as to keep an object in said compartment.

7. A vehicle seat comprising:
   a seat-frame and a seat-cushion disposed on the seat-frame;
   an under-seat compartment mechanism comprising:
      a hinge mechanism pivotally interconnecting the seat-frame and the seat-cushion so that the seat-cushion is pivotal with respect to the seat-frame;
      a compartment under the seat having an opening; and
   a lock mechanism, integrated with the hinge mechanism, for locking the seat-cushion at an upright position, at which the seat-cushion is pivoted with respect to the seat-frame so that said compartment becomes accessible,
   wherein said lock mechanism includes:
      a cam fixed on the seat-frame, said cam having a first slot and a second slot, and
      a lock member, disposed to the seat-cushion,, for selectively engaging with one of said first and second slot so that when said lock member engages with said second slot, the seat-cushion is locked in the upright position and so that when said lock member engages with said first slot, the seat-cushion is locked in a horizontal position at which the seat-cushion lays on the seat-frame horizontally.

8. A vehicle seat according to claim 2, further comprising:
   a seat-hook attached at a back face of the seat-cushion, and
   an inner lid strap attached to said inner lid to be hooked on said seat-hook.

9. A vehicle seat according to claim 8, further comprising an extra wall upwardly projected from an edge of the opening of said compartment along with tile edge of the opening.

10. A vehicle seat according to claim 1,further comprising:
   a seat-hook attached at the back face of the seat-cushion, and
   an inner lid strap attached to said inner lid to be hooked on said seat-hook.

11. A vehicle seat comprising:
   a seat-frame and a seat-cushion disposed on the seat-frame;
   an under-seat compartment mechanism comprising:
      a hinge mechanism pivotally interconnecting the seat-frame and the seat-cushion so that the seat-cushion is pivotal with respect to the seat-frame;
      a compartment under the seat having an opening;
      a lock mechanism, integrated with the hinge mechanism, for locking the seat-cushion at an upright position, at which the seat-cushion is pivoted with respect to the seat-frame so that said compartment becomes accessible;
      an inner lid, disposed between the seat-cushion and said compartment, for covering the opening of said compartment;
      a seat-hook attached at a back face of the seat-cushion; and
      an inner lid strap attached to said inner lid to be hooked on said seat-hook.

12. A vehicle seat according to claim 11, further comprising an extra wall upwardly projected from an edge of the opening of said compartment along with the edge of the opening.

13. A vehicle seat according to claim 12, further comprising one or more netting hooks, disposed around the opening of said compartment, for engaging a net so as so keep an object in said compartment.

14. A vehicle seat comprising:
   a seat-frame and a seat-cushion disposed on the seat-frame;
   an under-seat compartment mechanism comprising:
      a hinge mechanism pivotally interconnecting the seat-frame and the seat-cushion so that the seat-cushion is pivotal with respect to the seat-frame;
      a compartment under the seat having an opening:
      a lock mechanism, integrated with the hinge mechanism, for locking the seat-cushion at an upright position, at which the seat-cushion is pivoted with respect to the seat-frame so that said compartment becomes accessible;
      an extra wall upwardly projected from an edge of the opening of said compartment along with the edge of the opening; and
      one or more netting hooks, disposed around die opening of said compartment, for engaging a net so as to keep an object in said compartment.

* * * * *